UNITED STATES PATENT OFFICE.

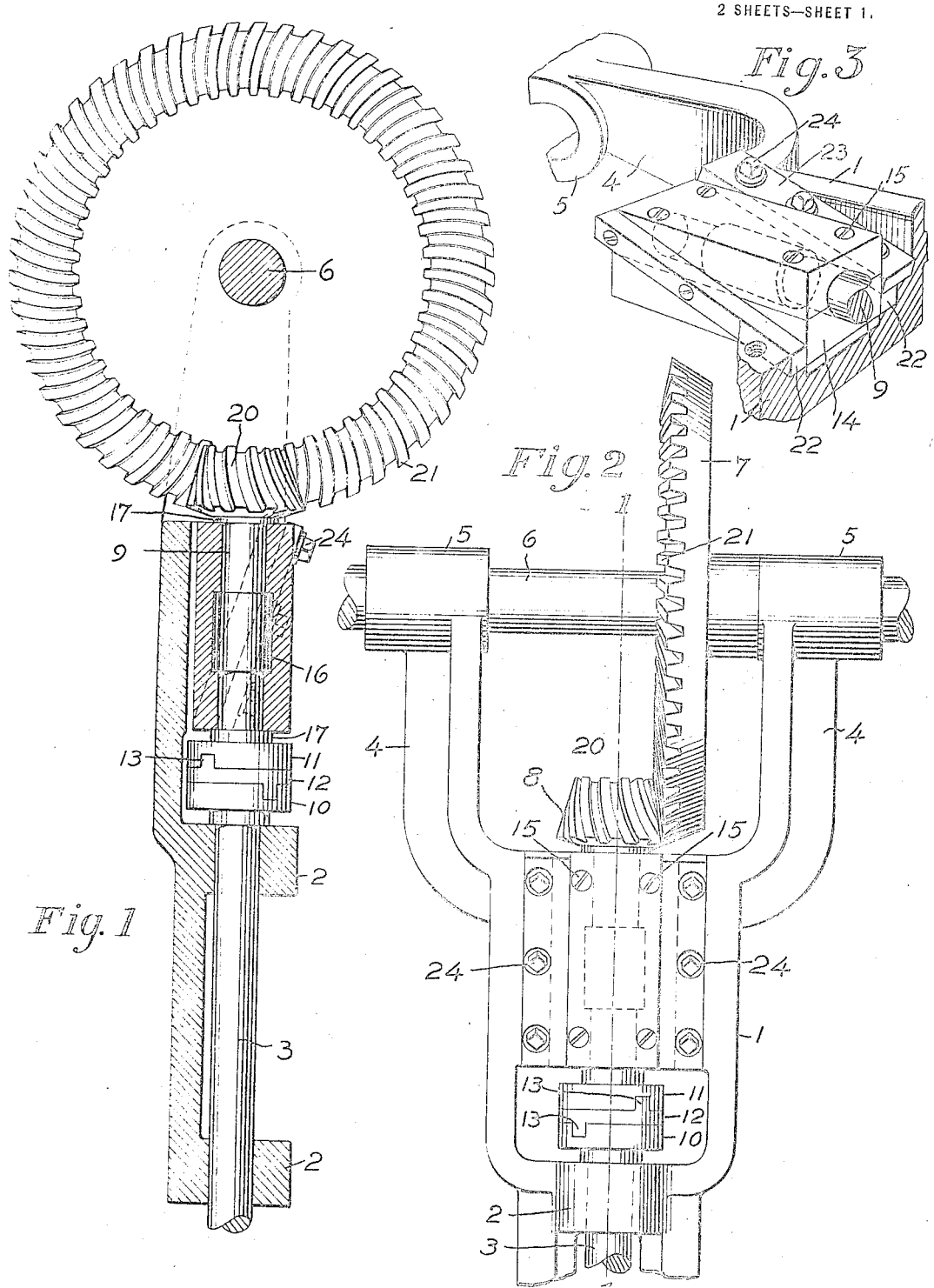

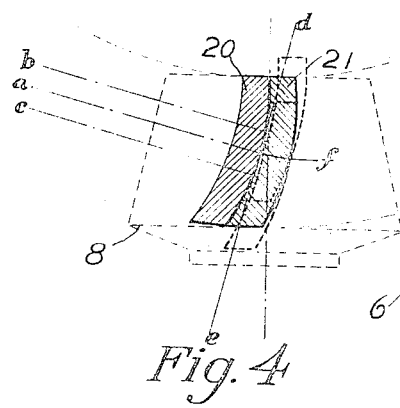
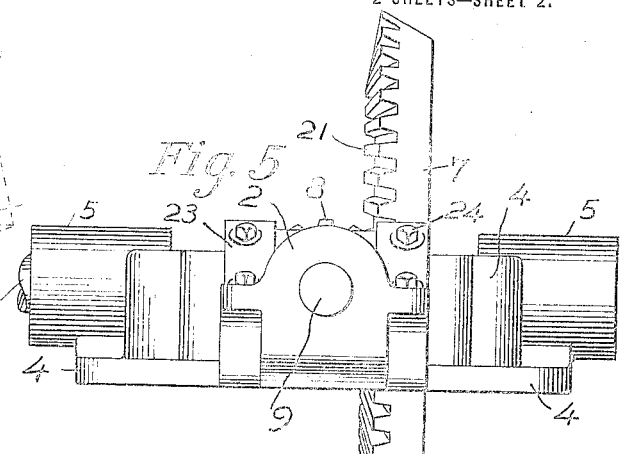
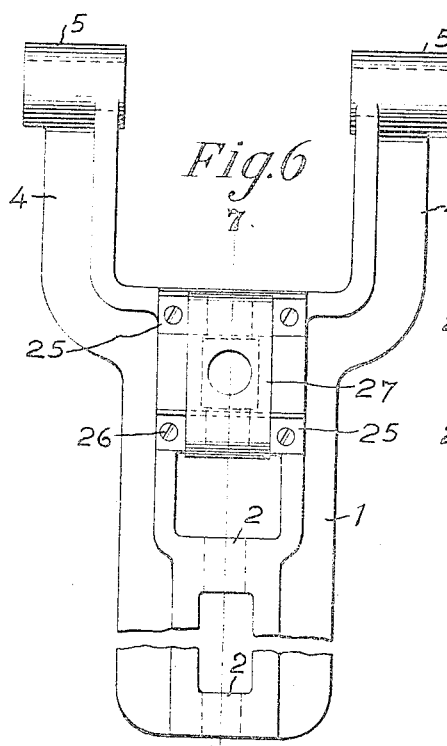
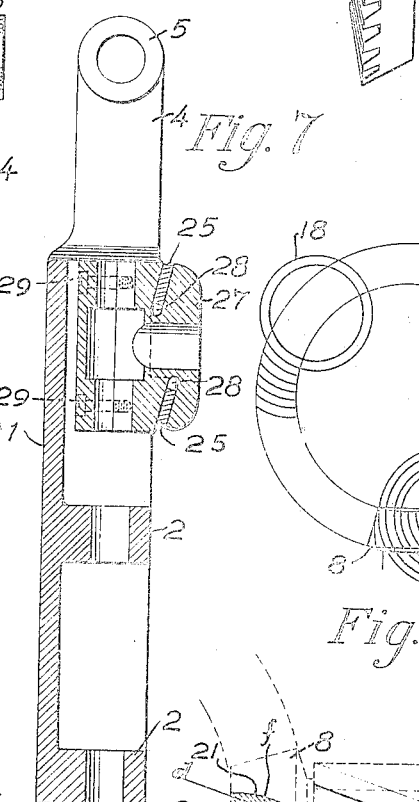
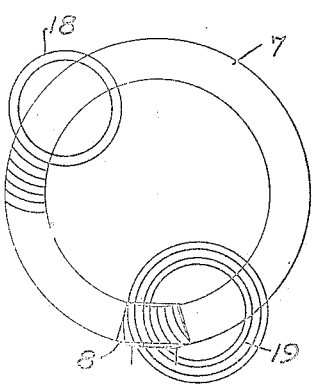
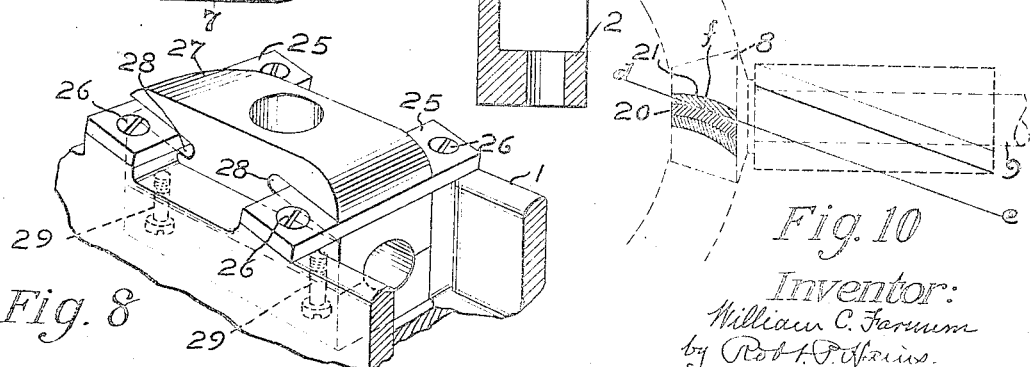
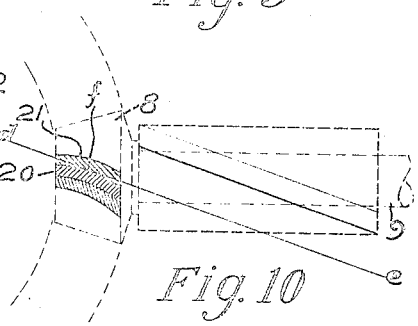

WILLIAM C. FARNUM, OF WINCHENDON, MASSACHUSETTS, ASSIGNOR TO WILLIAM M. WHITNEY, OF WINCHENDON, MASSACHUSETTS.

POWER-TRANSMISSION MECHANISM.

1,262,474.

Specification of Letters Patent.   Patented Apr. 9, 1918.

Application filed May 25, 1917.   Serial No. 170,995.

*To all whom it may concern:*

Be it known that I, WILLIAM C. FARNUM, a citizen of the United States, residing at Winchendon, in the county of Worcester and State of Massachusetts, have invented an Improvement in Power-Transmission Mechanism, of which the following description, in connection with the accompanying drawings, is a specification, like characters on the drawing representing like parts.

The invention to be hereinafter described relates to power transmission mechanism, and more particularly to that type of such mechanism employing toothed bevel members or gears between the driving and driven elements.

Owing to wear of the parts the teeth of the toothed members or gears soon get out of line, that is, the driving face of the teeth of one member fail to engage the driving face of the teeth of the other member throughout the length of the respective teeth, with the result that the entire driving pressure between the teeth is confined to a portion only, of the length of the teeth. This soon produces numerous objections well understood by those skilled in the art, among which may be noted excessive wear between the engaging portion of the teeth, lost motion, clatter, looseness and play between the parts.

One of the objects of the present invention is to provide a power transmission mechanism including bevel toothed members, the teeth of which are curved lengthwise and mounting one of said toothed members so that the driving pressure between the curved teeth will act to move one of the toothed members bodily in a direction to insure that the teeth of the said members shall always engage throughout substantially the length of the teeth even though the bearings and other parts become worn.

In carrying this self-alining feature of the bevel gears into effect in the present instance of the invention, the shaft carrying the driving bevel tooth member, and conveniently designated the driving shaft, is mounted in a bearing or block supported for bodily movement in a direction parallel to a tangent passing through the central point of the curve on which a bevel tooth of the driving member is formed when that tooth is engaged with a tooth of the driven toothed member. This feature of the invention, however, may be variously contrived to render the bevel gears self-alining under the driving pressure between the curved bevel teeth of the toothed members, all of which will best be made clear from the following description and accompanying drawing of one convenient form of means for carrying the invention into practical effect.

In the drawings:—

Figure 1 is a section on the line 1—1 of Fig. 2;

Fig. 2 is a plan view showing one form of self-alining gears embodying the present invention;

Fig. 3 is an enlarged detail partly in section, showing the bodily movable bearing or block carrying the driving shaft and part of the supporting framework;

Fig. 4 is a diagrammatic view showing the tendency of the curved and bevel teeth to move the toothed members into alinement, should such alinement become disturbed from any cause;

Fig. 5 is an end view of the construction shown by Fig. 2;

Fig. 6 is a plan view showing a modified form of bearing or block for the driving shaft and a portion of the supporting frame;

Fig. 7 is a section on the line 7—7, Fig. 6;

Fig. 8 is a perspective view, parts being broken away, showing the modified form of bearing or block and its connection with its guides;

Fig. 9 is a view showing diagrammatically the manner of forming the teeth in the driving and driven bevel tooth members; and Fig. 10 is a side elevation, partly in section, and parts being shown diagrammatically to illustrate the direction of movement of the driving member and its shaft relative to the tangent passing through the central portion of the curve on which the teeth of the driven member are formed.

The present invention is susceptible of general application in a train of mechanism for transmitting power, but as illustrated in the present drawings, it is shown as applied to the driving mechanism of an automobile, parts of said driving mechanism, only, being shown in order to make clear the characteristics of the invention as applied thereto.

The supporting frame 1 may be of any usual character, and as shown in the present instance of the invention, it comprises part of an automobile framework. The supporting frame 1 is provided with the bearings 2, 2 in which is journaled the power shaft 3 which may be of usual character and adapted to receive power through driving connections with the engine, such as usually employed in automobiles or the like.

The frame 1 has the extensions 4 provided with suitable bearings, 5, 5 in which may be supported a shaft 6, and which shaft, for identification, will herein be known as the driven shaft. Mounted on the driven shaft 6 and operatively associated therewith is the driven member 7 which, as shown in the present illustrated form of the invention, may consist of a bevel gear properly associated with the driven shaft 6. The driven member 7 or bevel gear receives motion from a driving member 8 which may be operatively connected to the shaft 9, said shaft 9 being herein designated as the driving shaft. The driving member 8 is formed as a bevel pinion and by intermeshed relation of the teeth of the gear 7 and pinion 8, power transmitted to the pinion 8 is transferred through the gear 7 to the driven shaft 6.

The driving shaft 9 receives motion from the power shaft 3 through the flexible connection with such power shaft. Such flexible connection, in the present instance of the invention, consists of a clutch of the Oldham type, comprising a member 10 secured to the power shaft and a corresponding member 11 secured to the driving shaft, said members having interposed between them a floating member 12 engaged by projections 13 and corresponding slots in the parts 10 and 11, as well understood in this type of clutch, the construction being such that the power shaft 3 and the driving shaft 9 may be moved bodily and relatively in a direction diagonal to the axis of said shafts.

The driving shaft 9 is supported in a suitable bearing or block 14 which is connected to the supporting frame 1 for movement in a direction diagonal to the axis of the driving shaft for a purpose that will presently appear. The block or bearing 14 for the driving shaft may be variously contrived, but in the present instance of the invention, it is formed of the upper and lower portions as indicated in Fig. 3, and properly secured together by bolts 15. The bearing or block 14 thus formed may have an enlarged central portion 16 to receive an enlarged portion of the driving shaft 9 so that any lengthwise movement imparted to the driving shaft 9 will be likewise imparted to the bearing or block which supports it. This feature of the invention may be variously carried into effect, and as shown, the driving shaft 9 may have at either end of the bearing or block 14, a washer or collar 17, the construction being such that as the driving shaft 9 moves other than rotatively, the block or bearing 14 will also move with it.

The teeth of the bevel driving and driven members are curved lengthwise and may be formed substantially as fully described in the prior application filed by me May 8, 1917, Serial Number 167,178. This characteristic of the interengaging teeth of the driving and driven members is graphically illustrated in Fig. 9, wherein the bevel teeth of the gear 7 are curved lengthwise by cutting the teeth on the arc of a circle, as indicated at 18, and the teeth of the pinion 8 are similarly formed on the arc of a circle, as indicated at 19, the construction being such that while the teeth of the pinion 7 and gear 8 are curved lengthwise on the arc of a circle, and are of the bevel gear type, the contacting faces of the gear teeth are preferably formed on the same or similar arcs, so that in normal and proper operative relation, the teeth of the pinion and gear will contact throughout substantially their entire length.

Referring to Fig. 4, it will be noted that the pinion 8 is provided with a tooth 20 shown in section, substantially at the pitch line, and the tooth 21 formed on the gear 7 is likewise shown in section with the contacting faces of the teeth engaged substantially throughout their entire length. The center of the arc on which the contacting faces of the teeth 20 and 21 in Fig. 4 are formed, is designated at $a$, Fig. 4. If, therefore, the driving and driven members be disturbed from their proper engaging relation, as indicated by full lines in Fig. 4, the effect of the driving pressure between the driving faces of the engaged teeth will tend to move the driving and driven members relatively in a direction to bring the engaging faces of the teeth into full contacting relation. For instance, if it be assumed that the driven member 7 be moved to carry its tooth 21 into the upper dotted line position, Fig. 4, the center of the curve on which that tooth is formed will be moved to the point $b$ and the lower edge of the tooth will engage the lower portion of its companion tooth 20 on the driving member, with the result that the driving and driven members will be relatively moved in a direction tangent to the central point $f$ of the arm on which the driving faces of the teeth are formed, as represented by the tangent line $d$—$e$, Fig. 4. Should either of the driving or driven members be susceptible of bodily movement in the direction of the tangent $d$—$e$, the driving pressure will move that member bodily to bring the teeth into proper driving relation so that the driving faces of the teeth shall contact throughout their length. Similarly, should a disturbing force or wear tend to move the driven member to carry its tooth 21 into the lower dotted line position, the center of the arc on which its contacting face is formed would be moved to $c$; and again, the contacting pressure would tend to bodily move the driving and driven members to bring the driving faces of the teeth back into full driving position, such movement taking place along the tangential line $d$—$e$ passing through the center $f$ of the curve on which the teeth are formed.

Viewing Fig. 10, it will be noted that if the driving member 8 and its driving shaft 9 are mounted for bodily movement in a direction parallel to the tangent $d$—$e$, the driving pressure exerted between the faces of the curved teeth of the driving and driven members will automatically effect bodily movement of the driving member in a direction parallel to the tangent passing through the central point $f$ of the arc on which the teeth of the driven member are formed, should the driving and driven members be disturbed from their proper driving relation, the tangent being drawn when the teeth are in driving engagement.

To effect bodily movement of the driving member to automatically aline the teeth of the driving and driven members by the driving pressure between the teeth of said members, the driving member may be variously mounted; but in the present instance of the invention the bearing or block 14 in which the driving shaft 9 is supported, is guided for free bodily movement in a direction parallel to the tangent $d$—$e$ passing through the center $f$ of a tooth 20 of the driving member when that tooth is in engagement with a tooth 21 of the driven member. As shown in Fig. 3, the bearing or block 14 may be provided with side projecting portions or flanges 22 which rest upon suitable supporting surfaces on the frame 1, and are held in proper relation thereto by the caps 23 overlying the projections or flanges 22 and secured in place by suitable means such as the bolts 24, the construction being such that should the bevel curved teeth of the driving and driven members be disturbed from their proper driving relation, as indicated by dotted lines in Fig. 4, the driving pressure between the teeth of the driving and driven members will automatically return the teeth into proper engaging relation throughout their entire length by a bodily movement of the driven member in a direction diagonal to the axis of the driving shaft, or in other words, in a direction parallel to the tangent passed through the central portion of the tooth of the driving member when that tooth is operatively engaged with the tooth of the driven member.

When the driving member is bodily moved, as hereinbefore described, the driving relation between the driving shaft 9 and the power shaft 3 remains undisturbed, the flexible or Oldham clutch between these shafts permitting such bodily movement without disturbance of their driving relation.

Various modifications will suggest themselves to those skilled in the art in carrying the general features of the invention into practical effect, and applicant desires it to be understood that the above-described means is only one of variously-contrived means that might be adopted for effecting the results sought; and the claims are therefore made generic in these respects.

In Figs. 6, 7 and 8, a modified form of mounting for the bearing or block carrying the driving shaft is illustrated. In this case the frame 1 has provided the cross-pieces 25 which are securely bolted to the frame 1 by suitable means such as the screws 26, and a bearing or block 27 for the driving shaft is provided with oblique guideways or slots 28 for engagement with the cross-pieces 25, said cross-pieces and slots being inclined with respect to the axis of the driving shaft, such inclination or diagonal arrangement of the slots and cross-pieces being substantially in parallelism with the tangent $d$—$e$ passing through the central portion of a tooth of the driving member when that tooth is operatively engaged with a tooth of the driven member. The block 27 may be conveniently formed in appropriate manner, and as shown is preferably split and provided with the bolts 29 for securing the two halves of the block in operative relation, although various modifications may suggest themselves in the formation of the block, as well understood by those skilled in the art.

What is claimed is:—

1. Power transmission gearing, comprising, in combination, a driving and a driven rotative member having intermeshing curved teeth, and means for supporting one of said members for movement in a direction parallel to a tangent passing through the center of the curved teeth of that member when that tooth is engaged with a tooth of the companion member.

2. Power transmission gearing, comprising, in combination, a driving gear and a driven gear each provided with intermeshing teeth curved on the arc of a circle, and supporting means for one of said curved tooth gears permitting bodily movement of said gear in a direction parallel to a line passing tangentially through the central point of the arc on which a tooth is described when that tooth is engaged with a tooth of the companion gear.

3. Power transmission gearing, comprising, in combination, a driving bevel gear and a driven bevel gear having intermeshing teeth curved on the arc of a circle, and supporting means for one of said bevel curved tooth gears permitting substantially free bodily movement of said gear in a straight path parallel to a tangent passing through the central point of the arc on which a tooth is described when that tooth is operatively engaged with a tooth of the companion gear that the two gears may be self-alining.

4. In a device of the character described, the combination of a driving member and a driven member, each provided with curved teeth, means for transmitting power to one of said members, and means for supporting one of the curved tooth members for bodily movement in a path parallel to a tangent passing through the central point of the curve on which the tooth is described when that tooth is operatively engaged with a tooth of the other member that the two members may be automatically maintained with their teeth in proper driving relation by the driving pressure of the teeth.

5. In a device of the character described, the combination of a driving shaft and a driven shaft, bevel gears having curved teeth operatively connecting the two shafts, and means for supporting one of said shafts for bodily movement in a path parallel to a tangent passing through the central point of the curve on which a tooth of the gear on said shaft is described.

6. In a device of the character described, the combination of a driving shaft provided with a bevel pinion having teeth curved lengthwise, a driven shaft provided with a bevel gear having teeth curved lengthwise to fit in the spaces between the curved teeth of the pinion, a bearing for the driving shaft, a support for said bearing, and connections between the bearing and support permitting the former to move in a path parallel to a tangent passing through the central point of the curve on which a tooth of the bevel pinion is described.

7. In a power transmitting train, the combination of a bevel driving member and its shaft, a bevel driven member and its shaft, each of said members being provided with teeth curved lengthwise in the arc of a circle, and means for supporting one of said members and its shaft to permit bodily movement of said member in a path parallel to a tangent passing through the central point of the curve of the tooth of said member due to the driving pressure.

8. In a power transmitting train, the combination of a bevel driving member and its shaft, a bevel driven member and its shaft, each of said members being provided with teeth curved lengthwise in the arc of a circle, means for supporting one of said members and its shaft to permit bodily movement of said member in a path parallel to a tangent passing through the central point of the curve of the tooth of said member due to the driving pressure, a power shaft, and a flexible connection between the power shaft and the shaft of the driving member.

9. In a power transmitting train, the combination of a power shaft, a driving shaft having a flexible connection with the power shaft, a bevel pinion secured to the driving shaft and having teeth curved lengthwise, a driven shaft, a bevel gear connected to the driven shaft and having teeth curved lengthwise and engaging the teeth of the bevel pinion, and means for supporting the driving shaft for rotative movement and a bodily movement in a direction parallel to the tangent passing through the central portion of the curve of the pinion teeth when they are operatively engaged with the teeth of the bevel gear, such bodily movement being due to the driving pressure between the teeth of the pinion and gear.

10. Self-alining gearing mechanism, comprising, in construction, a power shaft, a driving shaft flexibly connected thereto, a curved bevel tooth member connected to the driving shaft, a driven shaft, a curved bevel tooth member connected to the driven shaft, a block or bearing carrying the driving shaft, a support for said block or bearing, and connections between the block or bearing and its support permitting the block or bearing and driving shaft to move bodily in a direction parallel to a tangent passing through the central point of the tooth formed on the member carried by the driving shaft.

11. Self-alining gearing mechanism for the transmission of power, comprising, in combination, a driving shaft, a movable bearing carrying the driving shaft, a bevel pinion having its teeth curved lengthwise and mounted on the driving shaft, a bevel gear having its teeth curved lengthwise and meshing with the teeth of the pinion, and means for directing the movement of the movable bearing due to driving pressure of the intermeshing teeth in a path parallel to a tangent passing through the central point of the curve on which the teeth of the pinion are formed.

12. In a power transmitting train, the combination of a power shaft, a driving shaft, a driving connection between said shafts permitting relative bodily movements of said shafts diagonal to the longitudinal axis of the driving shaft, a movable bearing for the driving shaft, a bevel driving member secured to the driving shaft, a bevel driven member intermeshing therewith, said bevel driving and driven members having their teeth curved longitudinally to automatically effect bodily movement of the driving shaft in a direction diagonal to its longitudinal axis due to the driving pressure between the teeth of the bevel driving and driven members when the driving and driven members are not in proper driving relation.

13. In a power transmitting train, the combination of a power shaft and a driving shaft and operating connections, a driven shaft, bevel gearing connections between the driving and driven shafts, a bearing for one of the last-named shafts, bodily movable in a direction diagonal to the longitudinal axis of its shaft, the teeth of the bevel gearing connections between the driving and driven shafts being curved longitudinally and acting under the driving pressure between the teeth to bodily move one of the shafts diagonally to maintain proper driving relation between the teeth of the gearing connections.

14. In a power transmitting train, the combination of a driving shaft and a driven shaft, bevel gearing connections between said shafts, one of said shafts being bodily movable in a direction diagonal to the longitudinal axis of the shaft, the teeth of the bevel gearing connections between the driving and driven shafts being curved longitudinally and acting under the driving pressure between the teeth to bodily move one of the shafts diagonally when the teeth of the gearing connection fail to contact substantially throughout their length.

15. In a power transmitting train, the combination of a driving shaft and a driven shaft, bevel gearing connections between said shafts, one of the bevel gears being bodily movable in a direction diagonal to the longitudinal axis of its shaft, the teeth of the bevel gearing connections having their contacting or driving faces similarly curved on the arc of a circle and acting under the driving pressure between the teeth to bodily move one of said gears diagonally relative to the longitudinal axis of its shaft when the teeth of the gearing connection fail to contact substantially throughout their entire length.

In testimony whereof, I have signed my name to this specification.

WILLIAM C. FARNUM.